(12) United States Patent
Öttl et al.

(10) Patent No.: US 11,187,885 B2
(45) Date of Patent: Nov. 30, 2021

(54) BINOCULARS WITH EYEPIECE-BASED SUPPORT DEVICE

(71) Applicant: Swarovski-Optik KG., Absam (AT)

(72) Inventors: Peter Öttl, Mils (AT); Heinz-Eckhard Engel, Battenberg (DE); Sebastian Wachsmuth, Innsbruck (AT)

(73) Assignee: Swarovski-Optik KG.

(*) Notice: Subject to any disclaimer, the term of this patent is extended or adjusted under 35 U.S.C. 154(b) by 206 days.

(21) Appl. No.: 16/263,654

(22) Filed: Jan. 31, 2019

(65) Prior Publication Data

US 2019/0235226 A1   Aug. 1, 2019

(30) Foreign Application Priority Data

Feb. 1, 2018  (AT) ................ A 50094/2018

(51) Int. Cl.
*G02B 23/18* (2006.01)
*G02B 7/12* (2021.01)
*G02B 7/06* (2021.01)

(52) U.S. Cl.
CPC ............. *G02B 23/18* (2013.01); *G02B 7/06* (2013.01); *G02B 7/12* (2013.01)

(58) Field of Classification Search
CPC ............. G02B 23/18; G02B 7/06; G02B 7/12
USPC ...................................................... 359/407
See application file for complete search history.

(56) References Cited

U.S. PATENT DOCUMENTS

| 480,370 A | 8/1892 | Luddeckens |
| 6,499,594 B1 | 12/2002 | Koch |
| 6,741,392 B2 * | 5/2004 | Fu .................. G02B 27/64 359/554 |
| 2015/0070759 A1 * | 3/2015 | Yamamoto ........ G02B 7/12 359/413 |

FOREIGN PATENT DOCUMENTS

| DE | 76708 C | 8/1894 |
| DE | 1210583 B | 2/1966 |
| DE | 1905300 A1 | 1/1971 |
| DE | 29509962 U1 | 11/1995 |
| DE | 19953391 A1 | 5/2001 |
| DE | 10153167 A1 | 11/2002 |
| KR | 101642734 B1 | 7/2016 |

* cited by examiner

*Primary Examiner* — Kristina M Deherrera
(74) *Attorney, Agent, or Firm* — Lerner, David, Littenberg, Krumholz & Mentlik, LLP

(57) ABSTRACT

The invention relates to a binocular telescope comprising two tubes, which are connected in an articulate fashion with a swivel hinge pivotal around a joint bending axis. With a forehead contact unit comprising a comprehensive support device the binoculars can be supported in the area of the root of the nose or the forehead of the observer. The support device is here arranged at a body of the binoculars.

40 Claims, 6 Drawing Sheets

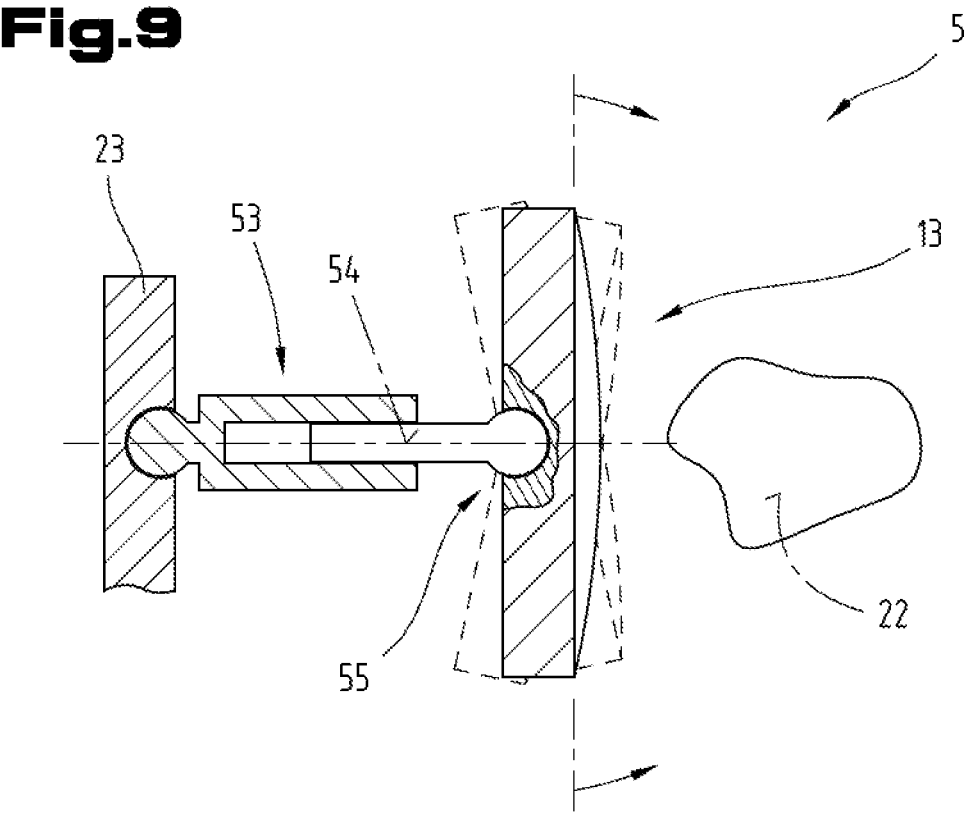

BINOCULARS WITH EYEPIECE-BASED SUPPORT DEVICE

CROSS REFERENCE TO RELATED APPLICATION

The present application claims priority from Austrian Application No. A 50094/2018 filed Feb. 1, 2018, the disclosure of which is hereby incorporated herein by reference.

BACKGROUND OF THE INVENTION

The invention relates to binoculars made of two tubes with a support device for supporting the binoculars on the forehead or root of the nose of a user.

Double-lens glasses, also called binoculars or field glasses, are used for hands-free monitoring of remote objects. Such products have been used for more than a century and are used for example in leisure, for hunting, and in the military. They usually consist of two mirror-symmetrically formed hollow bodies, arranged in a pivotal fashion about a common swivel axis—also called bending axis. At the user side these hollow bodies show a pair of eyepieces and at the lens side they show a pair of lenses. They are usually optical lens systems. A erecting system is arranged between the eyepiece and the lens assembly, the design of which determines the form of the binoculars (e.g. as a lens system, roof prism system, Porro-prism system, or system of reflectors). For example, DE 76708 shows a lens system, DE 1210583 the typically curved Porro construction, and DE 19953391 the attractive roof prism design type, which is slender and short. All 3 concepts show the typical, mirror symmetric design.

Additional differences are discernible in the variants of the focusing process: While DE 1210583 has so-called individual eyepiece adjustments, the binoculars of DE 76708 and DE 19953391 are equipped with a so-called central drive. The latter allows the convenient joint focusing for both eyes. However, for this purpose DE 76708 uses an "open" movement of the pair of eyepieces. This is subject to soiling due to the negative pressure resulting here. This is counteracted in the recent design according to DE 19953391 with a so-called internal focusing. Nevertheless, in both designs, the central drive axles coincide with the bending axes. That is usually the case. An exception is, for example, the design according to DE 10153167, which also works with internal focusing.

BRIEF SUMMARY OF THE INVENTION

Although these binocular designs differ from each other, they target a common goal, i.e. to enable a comfortable monitoring of distant targets with a substantially mirror-symmetrical pair of eyes. To do this, the pupil distance is taken into account by swiveling both binocular tubes about the common swivel axis, until the pupil distance and the distance between both optical axes of the eyepiece systems match. And for people wearing glasses, it is now mandatory that the eyepieces are equipped with rubber fold-over or sliding cups.

Nonetheless: In the event of extended observation, all constructions partially rest with both eyepieces at or in the eye sockets. This is exhausting, tiring, and over time—depending on the eyepiece design—even painful, and sometimes causes the observer to tremble. This is an even greater problem for people wearing glasses, because the support force of the eyepieces at the head is transferred via the glasses to the (root of the) nose. This leads to the often observed behavior of people wearing glasses to remove their glasses in order to use the binoculars. In addition, no wiggle-free observation is possible in case of strong enlargement.

The objective of the present invention was to overcome these and other disadvantages of the prior art and to provide a binoculars with a support device that enables a user to enjoy a permanent, calm, and fatigue-free observation using this device. Here, the support in the area of the root of the nose or the forehead of the user should always be carried out in the area or directly in the level of symmetry extending between either tubes or telescopes, regardless of the eye distance. In particular, an off-center arrangement of the forehead support or the forehead contact shall be possible with regard to the joint swivel axis.

This task is attained in a binoculars with a support device that can contact in the area of the root of the nose or the forehead of the user or a device for a support at the side of the eyepiece according to the claims.

The binoculars according to the invention, which can also be referred to as field glasses, binoculars, or opera glasses, comprises two tubes and a support device for the support of the binoculars at the side of the eyepiece on the face of the user, wherein the tubes are connected in an articulate fashion by a swivel hinge forming a swivel axis, with the support device comprising a forehead contact unit, with the support device being arranged at a body of the binoculars, allowing the binoculars to be supported by the forehead contact unit resting on the user in the area of the root of the nose or the forehead of the user.

The advantage achieved in this way is that, by arrangement of the forehead contact unit at a component of the binoculars, here in a simple fashion and with little structural expenses, an additional support of the binoculars is provided on the forehead or the root of the nose of the user. Thus, the eye distance or the axial distance of the two eyepieces can be adjusted independently of the position of the forehead support unit and it always remains in the level of symmetry of the binoculars.

It may also be advantageous if the device (VO) or the support device is fixed or can be fixed to one or more areas of the binoculars (FG) facing the user. This way, a stable and secure arrangement and fastening can be created.

It may further be advantageous if the forehead contact unit is arranged with its supporting point in the bending axis of the swivel hinge. This way, a simple and always reliable symmetrical arrangement of the forehead contact unit between the two pipes and/or telescopes can be created, here.

Another preferred embodiment is characterized in that the device or the support device is arranged on a roll of a central drive. Thus, a compact arrangement of the forehead contact unit on the binoculars can be created on the shortest route.

Another embodiment provides that the device or the support device is arranged on a connecting bending bridge which is arranged at the eyepieces in a manner that allows a longitudinal displacement in reference to the binoculars. This way a simple and secure holding of the forehead contact unit can be yielded also for such binoculars, at which at least one bending bridge is arranged at the side of the user.

Another embodiment is characterized by the fact that the device or the support device can be removed from the binoculars and can be later attached again. A multiple use of a support device with a forehead contact unit on different binoculars can thus be made possible.

In addition, it can be advantageous if the forehead contact unit of the device or the support device can be rotated in reference to the binoculars. A simple adjustment and setting option can thus be created.

Another possible and perhaps alternative embodiment has the features that the forehead contact unit of the device or the support device is axially adjustable in reference to the binoculars—preferably in a bending axis of the binoculars. This allows an additional adjustment and adaptation option of the forehead contact unit to different users.

A different alternative embodiment is characterized in that the forehead contact unit of the device or the support device is supported in a swaying fashion in reference to the binoculars. This way, the forehead contact unit can be adjusted and set in an even more individual fashion to different users and operating conditions.

In addition, it can be advantageous if the first monocular tube comprises a first housing part and at least a first bridge part, and the second monocular tube comprises a second housing part and at least a second bridge part and a swivel hinge, which connects the bridge parts facing each other in an articulate fashion, with the distance between the two tubes being adjustable by pivoting the two tubes about the joint bending axis, and an axis of symmetry is provided between the two tubes, located in a joint bending axis, and further a symmetry device is provided for the support device, with during a relative pivoting of the two tubes about a joint bending axis the support device, particularly a center of the support area of the support contact unit remains arranged by the symmetry device largely in the axis of symmetry located between the two tubes. The advantage achieved in this way is that, by providing a mechanically coupled symmetry device, a centered alignment of the forehead contact unit or the forehead support can be yielded in the symmetry plane extending between the two telescopes. By providing the symmetry device, here a higher design variety can be created with regard to the arrangement of the forehead contact unit in reference to the two tubes.

Another possible and perhaps alternative embodiment has the features that the symmetry device comprises a first adjusting element and a second adjusting element, wherein the support device being arranged by means of the two adjusting elements, particularly their forehead contact unit, seen in the axial direction of the joint bending axis, located in the area of the axis of symmetry or arranged laying in the axis of symmetry and the first adjusting element is in a drive connection to the first monocular tube or arranged fixed thereto and the second adjusting element is in a drive connection to the second monocular tube or is connected fixed thereto. By producing a fixed drive connection by means of a mechanical coupling, the pivoting movements performed can be safely transferred to the centering forehead contact unit to be centered when adjusting the eye distance. A direct and play-free centering movement can thus be ensured.

This can also be advantageous if the support device comprises a base part and the base part of the support device is in a drive connection to both the first adjusting element and to the second adjusting element. By providing a separate base element, here a better and more customized arrangement of the forehead contact unit on the binoculars is provided.

A possible alternative embodiment provides that a first eyepiece is housed in the first tube and thus a first eyepiece axis is defined and a second eyepiece is arranged in the second tube and thus a second eyepiece axis is defined, with the two eyepiece axes defining an Eyepiece plane, which Eyepiece plane is arranged further in a parallel direction in reference to the joint bending axis, and a center of a support area of the forehead contact unit is arranged on a side of the Eyepiece plane defined by the two eyepieces, facing away from the joint bending axis. By the additional distancing of the support element designed as the forehead contact unit on the side of the Eyepiece plane defined by the two eyepieces and pointing away from the joint swivel axis, depending on the selected extent of the distancing using the base element, an improved support effect can be achieved, depending on the selected extent of the distancing. Thus, the triangle formed starting at each eyepiece axis towards the forehead contact unit can be increased or enlarged. The base of the triangle forms here the distance between the two eyepiece axes in the level of the eyepieces.

It can also be advantageous if an adjusting device is provided, by means of which an adjusting device the forehead contact unit is adjustable relative to the base part in the direction of an axis of adjustment and thus a distance is formed that is adjustable in the direction of the common swivel axis between the support surface of the forehead contact unit and the base part. By the additional provision of an adjusting device, the forehead contact unit can be moved relative to the eyepieces in such a way that in a sufficiently reliable support of the forehead contact unit at the forehead of the user, here the optimal distance between the respective eye, especially the eyeball, and the respective eyepiece can be adjusted to both the respective user as well as to different observation conditions.

A different embodiment is characterized by the fact that the adjustment axis of the adjusting device has a parallel alignment with regard to the common swivel axis or an inclined orientation with regard to the common swivel axis. Depending on the selected alignment of the adjustment axis of the adjusting device, a more customized adjustment of the forehead contact unit can be carried out to the respective user.

Another possible embodiment has the features that the adjustment axis of the adjustment device is arranged extending in the symmetry plane. In this way, a centralized alignment of the forehead contact unit arranged on the adjustment device can always be achieved.

Another embodiment provides that a pivoting arrangement is provided with which pivot arrangement of the forehead contact unit is pivoted with its support surface in its position relative to the base part and thus a tilt of the support surface is formed with regard to the joint swivel axis that is designed to allow changes. By providing an additional pivoting arrangement, the support area formed by the forehead contact unit can be adapted yet more individually to the needs of the respective user in its orientation.

Another embodiment is characterized in that the base part comprises a support arm and the support arm together with the forehead contact unit is supported in a pivoted fashion about a center of rotation located on a joint swivel axis in a normal alignment with regard to the joint swivel axis at the observation device. By forming the base part as a support arm and due to its rotatable or pivotal bearing in or on the joint swivel axis between the two telescopes, an exact pre-defined swivel level can be provided in which the base part and the forehead contact unit attached thereto can be rotated together.

Another preferred embodiment is characterized in that the first adjusting element comprises at least one partial section of a toothed wheel and a center of the toothed wheel is arranged located in the joint swivel axis. Thus, the symmetry device can be configured as a transmission arrangement, and the pivoting movement can be transferred from a telescope to the base part and the forehead contact unit arranged thereat.

Furthermore, it can be advantageous if the second adjusting element covers at least a partial section of an inner gear and a center of the partial section of the inner gear is arranged in the joint swivel axis. Thus, a further part of the transmission arrangement can be provided for forming the symmetry device, so that the pivoting movement of the other telescope can also be transferred to the base part for the centering movement of the forehead contact unit.

Another alternative embodiment is characterized by the fact that a planetary gear is arranged between the partial section of the toothed wheel and the partial section of the inner gear and the planetary gear is mounted in a pivotal fashion on the support arm of the base part. By arranging and providing the additional planetary gear, a secure mechanical transmission of the pivoting movements can be transmitted, starting from the telescopes to the base element, and thus also to the forehead contact unit.

Another possible and perhaps alternative embodiment has the features that the transmission ratio from the partial section of the inner gear to the partial section of the toothed wheel amounts to 2:1. The transmission ratio can also be defined such that a roller diameter of the partial section of the inner gear has twice the value of a roller diameter of the partial section of the toothed wheel. By the precise selection of the transmission ratio, a secure centralized alignment of the forehead contact unit can always be achieved in the symmetry plane extending between the two telescopes.

Another embodiment provides that the first adjusting element comprises a first control lever, which is supported rotationally about the joint swivel axis. On the side facing the forehead contact unit, the partial section of the toothed wheel is disposed on the first control lever. Furthermore, if necessary the first control lever may be also equipped on its side of the joint swivel axis, opposite a partial section of the toothed wheel, with an actuation extension. If the first actuation extension is provided, then it is further held in the drive connection with the first monocular telescope and is in particular held fixed thereto. Through the formation of the first adjusting element as the first control lever and its pivotable or rotatable support in or on the joint swivel axis, a secure mechanical transmission of the swivel movement can be achieved upon the portion of the toothed wheel by means of the actuating extension provided and its stationary mounting on the first telescope.

Another embodiment is characterized in that the second adjusting element comprises a second control lever, which is pivotably mounted in the joint swivel axis, and is provided on its side pointing to the facial contact unit with a control lever arm and, if necessary, the second control lever is equipped with a second actuating extension on its side of the joint pivot axis opposite the second control lever arm. If the second actuation extension is provided, it is in a drive connection with the second monocular telescope, in particular it is held fixed on the second telescope. By the formation of the second adjusting element as a second control lever and its pivotable or rotatable support in or on the joint swivel axis, a safe mechanical transmission of the swivel movement can be achieved upon the control lever arm and the planetary gears mounted on it by the actuating extension provided and its stationary fastening at the second telescope.

A further preferred embodiment is characterized in that the carrier arm of the base part is equipped at its end section, distanced from the common swivel axis, with a partial section of an inner gear and a center of the partial panel of the inner gear is arranged located in the joint swivel axis. By the additional formation of at least one partial section of the inner gear at the carrier arm of the base part, in turn a part of the planetary transmission can be formed in order to be able to perform a secure mechanical transmission of the swivel movement upon the forehead contact unit.

In addition, it can be advantageous if a first planetary gear and a second planetary gear are arranged between the partial section of the toothed wheel and the partial section of the inner gear and the planetary gears are rotationally supported on the actuating lever arm of the second adjusting lever. By providing the two planetary gears and their mounting on the adjusting lever arm of the second control lever, here the pivot movement can be transferred from the partial section of the toothed wheel to the partial section of the inner gear and thus subsequently to the base part. Preferably two planetary gears of equal size are selected in order to be able to change the direction of rotation. On the one hand, the two planetary gears engage each other, whereby one of them engages the partial section of the toothed wheel (sun gear) and the other one engages the partial section of the inner gear (hollow wheel).

Another alternative embodiment is characterized in that the two planetary gears are arranged at the second control lever in such a way that they are mutually engaging, and the first planetary gear is engaged with the partial section of the toothed wheel and the second planetary gear wheel is engaged with the partial section of the inner gear. Thus, a very precise transmission of the swivel movement of the two telescopes upon the forehead contact unit to be centered or the forehead support can be made possible by the teeth mechanically engaging each other.

Another possible and perhaps alternative embodiment has the features that the two planetary gears have the same size, in particular the same tooth count. By selecting the same size of the two planetary gears, a change in the direction of rotation can be achieved easily on the sides of the planetary gears facing away from each other.

Another embodiment provides that the two planetary gears are arranged behind each other in a radial alignment with regard to the common swivel axis on the second adjusting lever. A space-saving arrangement of the symmetry device can thus be achieved.

A different embodiment is characterized in the fact that the transmission ratio from the partial section of the inner gear to the partial section of the toothed wheel is 2:1. The transmission ratio can also be defined if a roller diameter of the partial section of the inner gear has twice the value than a roller diameter of the partial section of the toothed wheel. By the exact selection of the transmission ratio, a secure centralized alignment of the forehead contact unit can always be achieved in the symmetry plane extending between the two telescopes.

Another preferred embodiment is characterized in the first adjusting element being formed by a first bolt with a first bolt axis and the second adjusting element by a second bolt with a second bolt axis and the bolt axes of both bolts have respectively a parallel alignment with regard to the common swivel axis. By forming the first adjusting element as bolts, a simple, secure mechanical support and force transmission can be created on the base part. Due to the fact that the second adjusting element is embodied as a bolt, a canting-free guide can be enabled in the oblong hole.

Furthermore, it can be advantageous if the first bolt is arranged on a side of the symmetry plane as well as spaced from it, and the second bolt is arranged on the opposite side of the symmetry plane as well as spaced from it, and that the two bolts with their bolt axes are arranged in a normal alignment coinciding with the normal plane aligned with the symmetry plane and the normal plane shows a parallel alignment with regard to the level of the eyepiece. An exact positioning and alignment of the base part can thus be achieved.

Another alternative embodiment is characterized by the fact that the two bolts are arranged with their bold axes being symmetrical with regard to the symmetry plane. Thus, in the setting of the eye distance and the relative pivotal movement of the telescopes connected thereto, always the same adjustment path can be transferred to the base part, based on the center of the pivotal axis.

Another possible and perhaps alternative embodiment has the features that, in the base part of the support device on a side of the symmetry plane as well as distanced therefrom a first recess or a first aperture is provided, and on the opposite side of the symmetry plane and distanced therefrom a second recess or a second aperture is provided. Due to the bilateral arrangement of recesses or apertures in the base part of the support device, a mechanical coupling with the adjusting elements designed as bolts can be achieved and created.

Another embodiment provides that the first recess or the first aperture, as well as the second recess or the second aperture in the normal alignment are arranged in the normal plane aligned with the symmetry plane, and the normal plane has a parallel alignment with regard to the level of the eyepiece. In this way, a nearly complete, centrally oriented arrangement of the forehead contact unit can be ensured even with and after adjustment movements carried out.

Another embodiment is characterized in the fact that the first recess or the first aperture is designed as a bore hole. A mechanical fixed point can thus be created for supporting the base part on one of the telescopes.

Another preferred embodiment is characterized in that the second recess or the second aperture is designed as an oblong hole and the oblong hole extends in the direction of the normal level. By the selection of the oblong hole and the acceptance therein of the second adjusting element embodied as a bolt, the implementation of the swivel movement is enabled without hindrance. Furthermore, the base part is also maintained in a constant relative position with regard to the two telescopes.

Furthermore, it can be advantageous if a center of the bore and a center of the oblong hole are symmetrically arranged with regard to the level of symmetry. Thus, the adjustment to adjust the distance of the eyes can be carried out based on a defined central position of both telescopes in both pivoting directions.

Another alternative embodiment is characterized by the first bolt being engaged in the first recess or the first aperture and the second bolt being engaged in the second recess or the second aperture of the base part. Thus, a mechanically secure coupling and transfer of adjustment movements from the bolts to the base part can be achieved.

Another possible and perhaps alternative embodiment has the features that the base part is formed in a single piece and the recesses or apertures are designed or arranged therein, and the forehead contact unit is also arranged on it. A compact construction unit of the base part can thus be created. In addition, the forehead contact unit can also be held in a stable fashion and fixed to the base part.

Another possible alternative embodiment provides that the base part comprises a first control arm with a first end region and a second end region and a second control arm with a first end region and a second end region, and the two first end regions of the control arms are connected to each other in an articulate fashion, and the second end region of the first control arm rests on the first adjusting element formed by the first bolt, and the second end region of the second control arm rests on the second adjusting element formed by the second bolt. By dividing the base part into two separate control arms, a stationary and stable arrangement and support can be provided for each of the telescopes. By the articulate connection of the two control arms on the side facing away from the telescopes, and the mounting and fastening of the forehead contact unit in the area of the mutual articulate connection between the control arms, here a simple symmetry device can be created.

A different embodiment is characterized by the fact that the forehead contact unit is arranged in the first end section of the control arms connected to each other in an articulate fashion. In turn, a mechanical fixed transmission of the swivel movement of both telescopes can be ensured on the centrally attached forehead contact unit and a centering connected thereto in the level of symmetry can be ensured.

In the case of binoculars, preferably a double telescope for hands-free or supported monitoring, a third bearing point is created with a device according to the invention, in addition to the two mandatory supporting points of the eyepieces in the face of the observer, wherein it is located essentially in the level of symmetry of the face of the observer and is preferably located in the level of symmetry of the binoculars, wherein the third support point or the third support surface contacts in the area of the root of the nose or the forehead of the observer. For the design it has proven advantageous to arrange the support point in the bending axis of the hinge of the binoculars designed as a swivel hinge and also called a bend bridge. This ensures that at a different eye distance or axial distance of the two eyepieces, the third support point as a forehead contact unit is always in the level of symmetry of the face of the observer, independent from each observer. Geometrically, regardless of the eye distance, an equilateral triangle is always adhered to, with its "apex" representing the third contact area.

The device according to the invention can be easily applied in the case of binoculars in which the hinge or the hinges of the bent bridge directly face the observer. This is, for example, the case when the rotary roller of the central drive is arranged between two hinges. Or, if no central drive is provided, for example in case of individual adjustments of the eyepieces. It is more difficult if the front face of the focusing roller at the side of the observer freely points to the observer. Then, in a more detailed embodiment of the invention, the forehead support unit must be provided in an axially fixed and yet rotational fashion in reference to the central drive roller. This way, in spite of supporting the binoculars on the forehead of the observer, a smooth focusing process is ensured.

In a further embodiment of the invention, it is provided to design the forehead contact unit at the binocular side such that it allows to adjust the best-suited axial support measure for the observer.

Another alternative embodiment is characterized by the device (VO) being used for monoculars.

For better understanding of the invention, it is explained in greater detail based on the following figures.

BRIEF DESCRIPTION OF THE DRAWINGS

Additional features, details and advantages of the invention are based on the wording of the claims, as well as the following description of the exemplary embodiments based on the figures.

In each case, it is shown in a very simplified, schematic illustration:

FIG. 9 is the base part of the support device with the forehead contact unit, sectioned to show a side view, as well as a largely schematic illustration.

DETAILED DESCRIPTION

Figure 1:
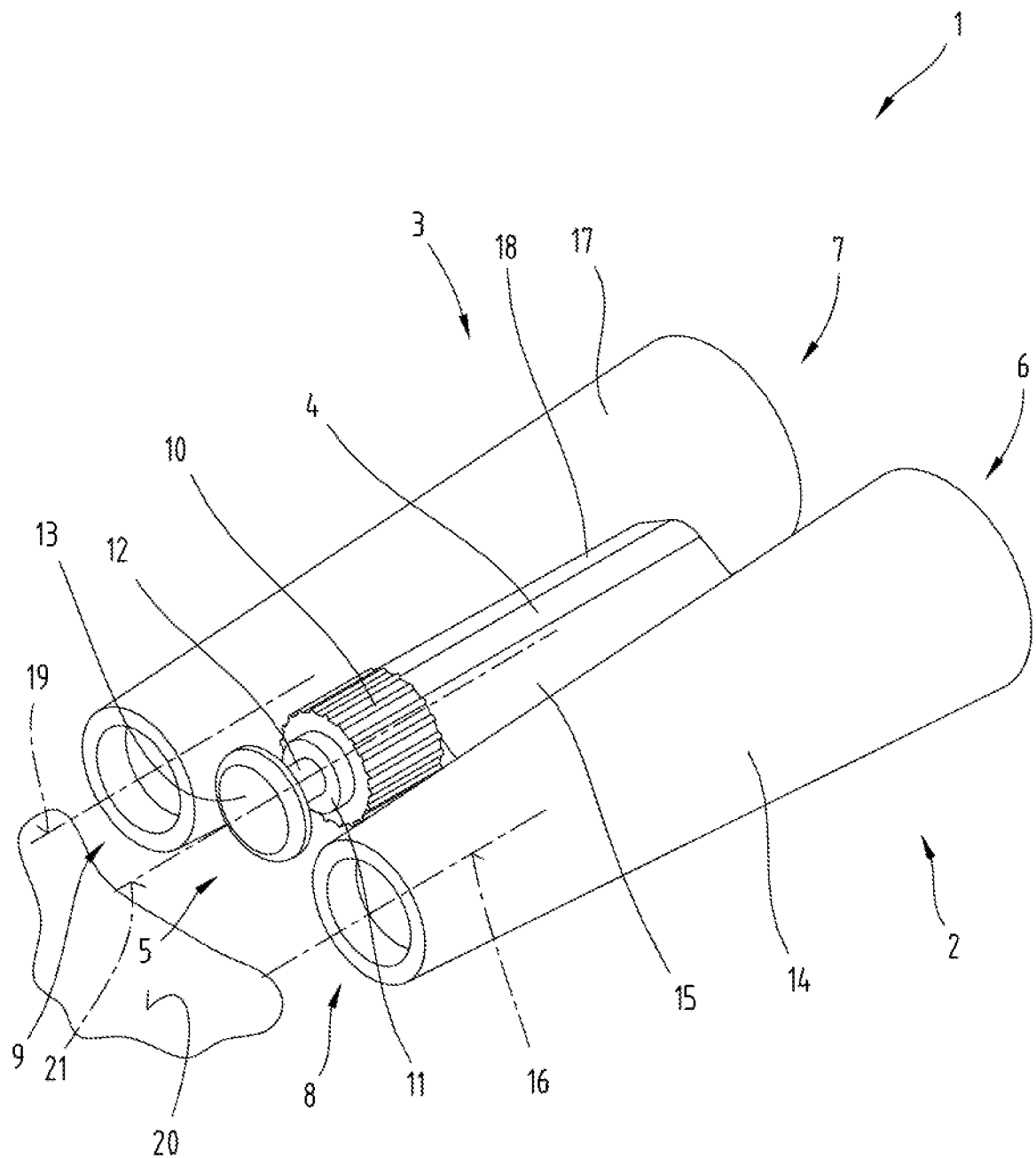
FIG. 1 is a perspective view of binoculars with a support device according to the invention.

First it must be stated that in the various embodiments described, identical parts are provided with the same reference characters or identical component designations, whereby the disclosures contained in the entire description can be transferred accordingly to identical parts with identical reference characters or identical component designations. Furthermore, the location information selected in the description, such as above, at the bottom, at the side, etc. is related to the respectively described and shown figure and such location information must correspondingly be transferred to the new location in case of a change in location.

The term "in particular" is understood in the following in such a way that it can be a possible more specific embodiment or more detailed specification of an object or a process step, but not necessarily a compelling, preferred embodiment of the same or a mandatory procedure.

Binoculars refer here (in German) to an optical instrument or observation device, which allows the observation of an object via two separate beam paths using simultaneously both eyes. The observer is provided here with a stereoscopic vision of a plastic, three-dimensional depth impression. The known examples of binocular are the binocular telescope, such as the field glass or the opera glass.

In principle, binoculars represent a portable telescope, generally used in a hands-free fashion. It is predominantly used in the market in a binocular design that allows objects to be monitored with both eyes via separate beam paths. The binoculars are offered in a simple lens design as a theater glass (opera glass, Galileo telescope), on the other hand as prismatic binoculars (Kepler telescope), which is also called colloquially a field glass.

According to FIG. 1, an embodiment is shown that is formed essentially from two tubes 2, 3, which are connected in an articulate fashion by a swivel hinge —SS— 4, forming binoculars —FG— 1 which in the direction of the object is followed by two lenses —OB— 6, 7 and on the observer side by two eyepieces 8, 9 and a roller-shaped central drive 10, is provided showing on its free forehead side is, comprising the mounting base —MS— 11, support profile —SP— 12, and forehead contact unit —SA— 13, the device or support device 5, wherein the forehead contact unit —SA— 13 is rotational in reference to the central drive —MT— 10 and the forehead contact unit —SA— 13, is axially adjustable compared to the binoculars —FG— 1. For comfortable and convenient contacting of the forehead contact unit —SA— 13 at the head of the observer, it may be padded and mounted swaying. Preferably, its circumferential edge at the observer side is rounded. Preferably the support device —VO— 5 is essentially designed rotationally symmetrically, wherein this can generally be referred to as a resting device or support device. The binoculars —FG— 1 can also be referred to as a binary observation device in the embodiment described above. Both tubes 2, 3 can also be called telescopes.

Binocular observation devices, such as binoculars 1, field glasses, or opera glasses, essentially include the first monocular tube 2 or the first telescope, the second monocular tube 3 or the second telescope, and the two tubes 2, 3 are connected together with the swivel hinge 4. The swivel hinge 4 can also be called a joint.

Furthermore, in FIG. 1, it is additionally shown that the first monocular tube 2 or the first telescope comprises a first housing part 14 and at least one first bridge part 15 arranged or formed thereat. The first housing part 14 contains at least the first objective lens 6 and the first eyepiece 8 and, if necessary, additional optical components are included, here. The first eyepiece 8 defines a first eyepiece axis 16 on the observer side.

The second monocular tube 3 or the second telescope comprises a second housing part 17 and at least one second bridge part 18 arranged or formed thereat. In the second housing part 17 at least the second objective lens 7 and the second eyepiece 9 and, if necessary, additional optical components are included here. The second eyepiece 9 defines a second eyepiece axis 19 on the observer side. Both eyepiece axes 16 and 19 are preferably aligned parallel to one another and jointly define an Eyepiece plane 20.

The swivel hinge 4 defines a common swivel axis, which can also be called a bending axis 21, wherein using the swivel hinge 4 the bridge parts facing each other 15, 18 of both monocular tubes 2, 3 are held to each other in a manner pivotal about the bending axis 21. This pivotability serves to set and adjust the eye distance to the respective user.

The Eyepiece plane 20 is further aligned extending in a parallel direction with regard to the common bending axis 21. Furthermore, binocular observation devices or binoculars 1 show, arranged or extending between the two tubes 2, 3, a symmetry plane 22. The symmetry plane 22 refers here to both eyepiece axes 16 and 19 of the two eyepieces 8 and 9. Furthermore, the symmetry plane 22 is arranged extending between the two tubes 2, 3 in the joint bending axis 21. The symmetry plane 22 also shows a normal alignment or a right angle alignment with regard to the Eyepiece plane 20. By the relative mutual pivotability of the two tubes 2, 3 the binocular observation device or the binoculars 1 can be adjusted to different eye distances. In the case of a level or horizontal alignment of the Eyepiece plane 20 here the symmetry plane 22 is aligned perpendicular in reference thereto.

Figure 2:
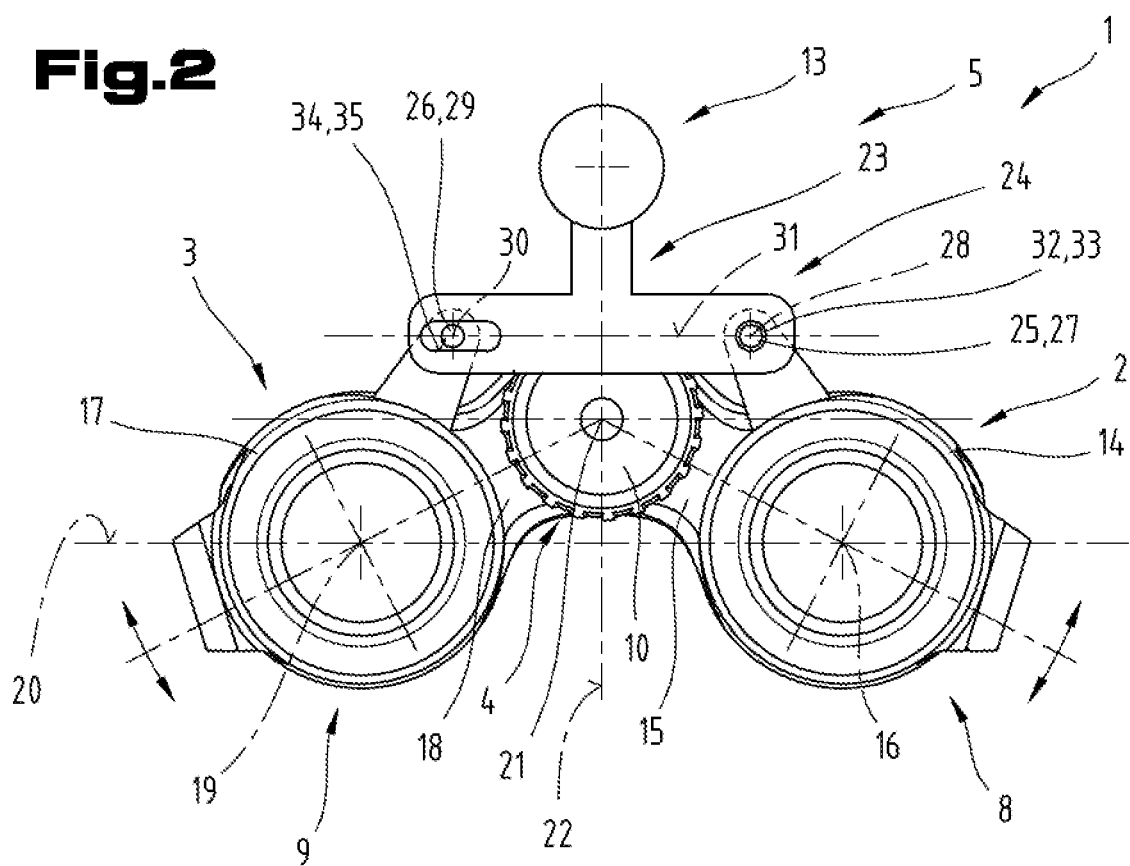
FIG. 2 is other binoculars with a support device and a symmetry device, in a front view and in a very schematic representation.

FIG. 2 shows another and, if necessary, an independent embodiment of the binocular observation device or binoculars 1 wherein, in turn, the same reference characters or component designations are used for identical parts as in the previous FIG. 1. In order to avoid unnecessary repetitions, reference is made or similarities are pointed out to the detailed description in the previous FIG. 1. For a better overview, a detailed illustration of the tubes 2, 3 as well as the two bridge parts 15, 18 connecting the swivel hinge 4 is omitted, here. The support device 5 is arranged at the eyepiece side on the binocular observation device or binoculars 1.

All the embodiments of the support device 5 described in the following can be removed from the binoculars 1 and can be reassembled. Furthermore, the forehead contact unit 13 is rotational and/or axially adjustable in reference to the binoculars 1. It is also possible to provide a swaying arrangement in reference to the binoculars 1 for the forehead contact unit 13. In the following exemplary embodiments, the forehead contact unit 13 is arranged with its support surface or support center not located in the bending axis 21 but outside thereof, aligned in the normal direction, at a distance from the tubes 2, 3, especially their eyepieces 8, 9.

In all of the exemplary embodiments described below, it is respectively provided that the support device 5, even when the two tubes 2, 3 are pivoted relative to each other, to adjust the respective eye distance, remain arranged located in the area of the symmetry plane 22 or in the symmetry plane 22. Furthermore, the forehead contact unit 13 is arranged in such a way with regard to the joint bending axis 21 that it is located outside the common bending axis 21 as well as, facing away from the common bending axis 21, on the side of the symmetry plane 22. In this selected arrangement is a center of a support surface of the forehead contact unit 13 is arranged on the side, facing away from the joint bending axis 21, of the two eyepieces 8, 9 defining the Eyepiece plane 20. Depending on the design and form of the forehead contact unit 13 in principle, the center is respectively designed thereat in each case. The support surface of the forehead contact unit 13 can be designed in a rotationally symmetric, arched, oval or similar manner. Furthermore, the forehead contact unit 13 can in general be called a support element or a forehead support.

The design of the support device 5 shown here comprises a base part 23 and the forehead contact unit 13 arranged or formed thereat. Furthermore, a symmetry device 24 is also provided, which comprises in turn a first adjusting element 25 and a second adjusting element 26. With the two adjusting elements 25, 26 the support device 5, especially its forehead contact unit 13, remains arranged in place in the axial direction of the joint bending axis 21, seen in the area of the symmetry plane 22.

The first adjusting element 25 is here arranged with the first monocular tube 2 in a drive connection or it is arranged on the monocular tube 2 in a location-fixed fashion. The second adjusting element 26 is here in a drive connection with the second monocular tube 3, or it is arranged fixed on the monocular tube 3. The mounting can occur, for example, on the respective housing part 14, 15, on the respective bridge part 15, 18 or in each case, on an individual, separate component provided for this purpose and not shown in greater detail. Here, the drive connection is understood not merely as contacting or supporting, but a coupling in a mechanical, form-fitting fashion.

The base part 23 of the support device 5 is therefore in a drive connection with the first adjusting element 25 as well as the second adjusting element 26.

The first adjusting element 25 is here formed by a first bolt 27 with a first bolt axis 28. The second adjusting element 26 is formed here by a second bolt 29 with a second bolt axis 30. Both bolt axes 28 and 30 of the bolts 27 and 29 each show respectively a parallel alignment with regard to the common bending axis 21. Furthermore, the first bolt 27 is arranged on one side of the symmetry plane 22—here, at the right side—as well as distanced therefrom, with the second bolt 29 being arranged on the opposite side of the symmetry plane 22—here at the left side—as well as distanced therefrom. The two bolts 27, 29 are with their bolt axes 28, 30 in a normal alignment arranged located on the symmetry plane 22 as the aligned normal plane 31. The normal plane 31 preferably also shows a parallel alignment with regard to the Eyepiece plane 20. The two bolts 27, 29 are preferably with their bolt axes 28, 30 arranged symmetrical with regard to the symmetry plane 22.

The two bolts 27 and 29 forming the adjusting elements 25 and 26 are stationary here and arranged fixed at one of the tubes 2, 3. In order to allow forming or creating a drive connection or a coupling connection between the bolts 27 and 29 and the base part 23, here in the base part 23 of the support device 5, on a side of the symmetry plane 22 and distanced therefrom, a first recess 32 or a first aperture 33 is arranged or formed and on the opposite side of the symmetry plane 22 and distanced therefrom a second recess 34 or a second aperture 35. The first bolt 27 engages the first recess 32 or the first penetration 33, wherein the second bolt 29 engages the second recess 34 or the second aperture 35 of the base part 23.

The first recess 32 or the first aperture 33 as well as the second recess 34 or the second aperture 35 are in each case arranged located in the normal direction on the symmetry plane 22 aligned to the normal plane 31. As described above, the normal plane 31 shows in this exemplary embodiment a parallel alignment with regard to the Eyepiece plane 20.

The first recess 32 or the first aperture 33 is designed as a bore hole here. The first recess 32 or the first aperture 33 shows a size, which is approximately equivalent to an external dimension of the first bolt 27. Thus, a sufficiently reliable guide and positioning of the base part 23 can be achieved relative to the first tube 2. Thus, this area represents a fixed point between the base part 23 and the first tube 2. It would also be possible to form the recess 32 or the first aperture 33 as an oblong hole and the second recess 34 or the second aperture 35 as a bore hole.

In order to allow performing the pivoting movement of both tubes 2, 3 without the basic part 23 preventing this, the second recess 34 or the second aperture 35 is designed as an oblong hole. The oblong hole extends in the direction of the normal plane 31, here. In addition, a center of the bore and a middle of the oblong hole can be arranged symmetrically with regard to the symmetry plane 22.

Furthermore, it is also provided here that the base part 23 is formed in one piece and in it the recesses 32, 34 or apertures 33, 35 are designed or arranged. The forehead contact unit 13 can be designed like a button and also arranged or embodied on the base part 23. The layout of the base part 23 is selected here as an upside-down "T", but a triangular shape or the like can be selected here as well.

Figure 3:
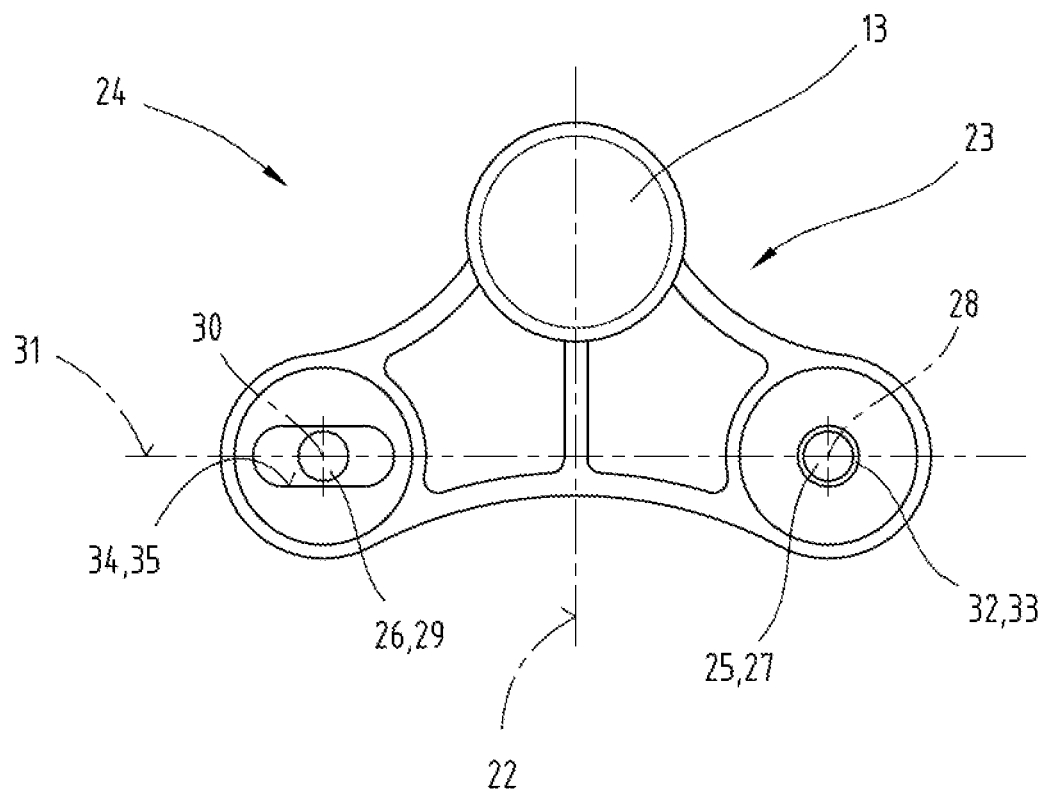
FIG. 3 is a possible embodiment of a base part of the support device in a front view as well as in a highly schematic representation.

FIG. 3 shows another and, if necessary, independent embodiment of the basic part 23 described above, wherein in turn the same reference characters or component designations are used for identical parts, as in the previous FIGS.

1 and 2. In order to avoid unnecessary repetitions, reference is made to the detailed description in the previous FIGS. 1 and 2 or pointed to. The basic structure of the support device 5 described in FIG. 2 as well as the symmetry device 24 is unchanged and is therefore not described in greater detail.

For attaching the bolts 27, 29, the sections of the base part 23 are provided, respectively seen in the direction of the bending axis 21, in a round or button-shaped manner. The base part 23 is embodied lattice-shaped with individual connection braces in an area between the bolts 27, 29 forming adjusting elements 25, 26 and the arrangement area of the forehead contact unit 13.

In the embodiments of the base part 23 described in FIGS. 2 and 3, based on the support of the base part 23 formed on the side as a fixed point, and the oblong hole formed on the other side, a slight lateral movement occurs and thus a not one-hundred percent centric alignment of the center of the forehead contact unit 13 with regard to the symmetry plane 22.

Figure 4:
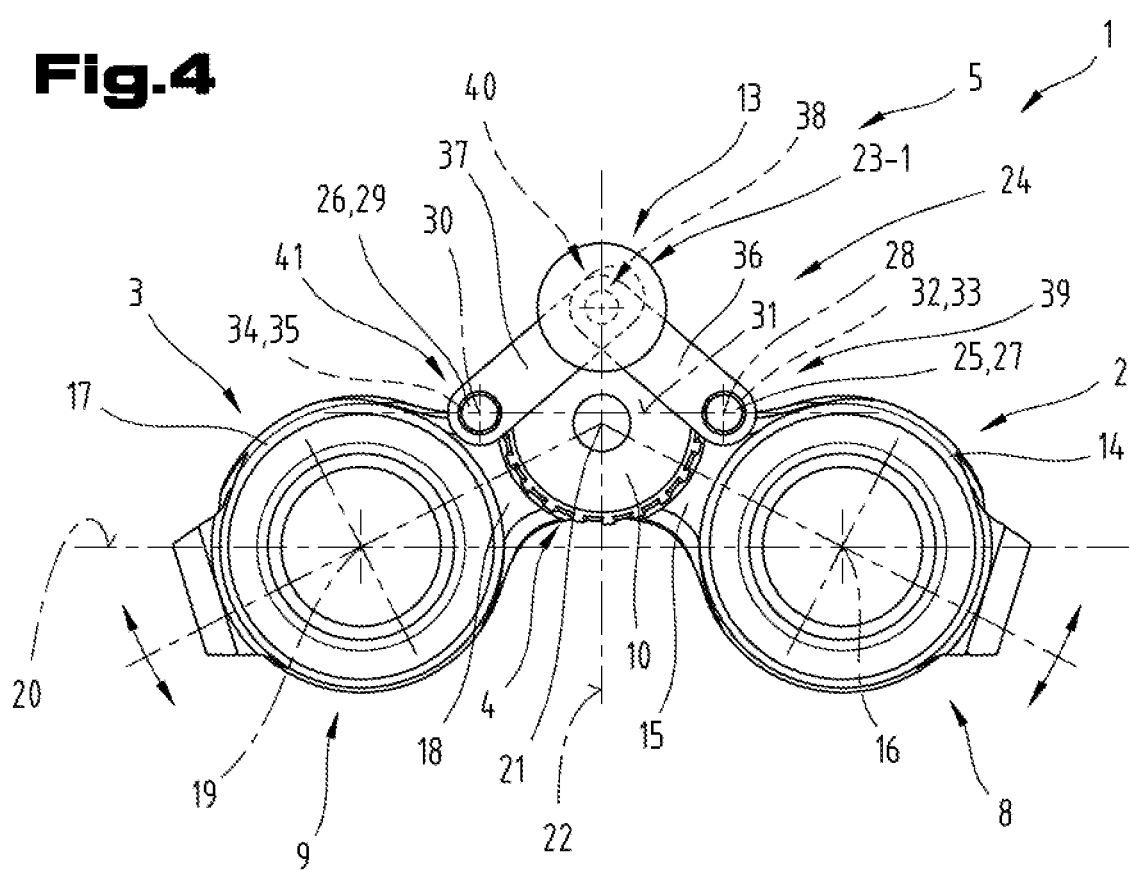
FIG. 4 is another possible design of the support device and the symmetry device, in a front view as well as a highly schematic representation.

FIG. 4 shows another and, if necessary, an independent embodiment of the support device 5 as well as the symmetry device 24, wherein in turn the same reference characters or component designations are used for identical parts, as in the previous FIGS. 1 to 3. In order to avoid unnecessary repetitions, reference is made to the detailed description in the previous FIGS. 1 to 3 or pointed to.

Here, the two adjusting elements 25 and 26 are also provided, which are arranged locally fixed on the respective tube 2, 3. They form fixed rotary points or support points for a base part 23-1, which due to the embodiment deviating in its basis 23 described above are provided with a separate reference character.

The two adjusting elements 25 and 26 can, e.g., again be embodied as bolts 27, 29 or pins. The base part 23-1 comprises a first control arm 36 and a separate, independent second control arm 37. The first control arm 36 is usually formed in a flat profile form and has a first end section 38 and distanced therefrom a second end section 39. Here, the second control arm 37 is also preferably formed with a flat profile design and has a first end section 40 and a second end section 41 arranged distanced therefrom. Both control arms 36, 37 are each aligned, starting with the two adjusting elements 25 and 26, extending toward one another. In the area of the forehead contact unit 13, the two first end sections 38, 40 of the control arms 36, 37 are jointly connected with one another in an articulate fashion by means of a joint arrangement which is not described in greater detail. This can, for example, be a pin or a bolt or the like. Furthermore, the second end section 39 of the first control arm 36 is supported on the first adjusting element 27 formed by the first bolt 25 in a manner that it can be swiveled or rotated about the first bolt axis 28. For this purpose, in the second end section 39 of the first control arm 36 the first recess, 32 is provided designed as a hole or as a blind hole, or the first penetration 33.

The second end section 41 of the second control arm 37 is supported on the second adjusting element 29 formed by the second bolt 26 in a manner that it can be swiveled or rotated about the second bolt axis 30. For this purpose, in the second end section 41 of the second control arm 37 the second recess 34 or the second aperture 35 is provided, which is also designed as a hole or as a blind hole.

Both control arms 36 and 37 show, starting from the recesses respectively formed in the second end section 39, 41, formed as bores 32, 34 or apertures 33, 35 the same construction length for the joint arrangement and joint connection site, not described in greater detail.

The forehead contact unit 13 is preferably connected with the center of its support surface in the area of the two first end regions 38, 40 connected to each other in an articulate fashion, to the control arms 36, 37 and projects towards the user from the base part 23-1 and thus from the side facing away from the lens 6, 7. The spatial shape of the forehead contact unit 13 can be like a mushroom, wherein the shaft may be equivalent to the support profile 12 described above.

The two adjusting elements 25, 26 or the bolts 27, 29 forming them with their bolt axes 28, 30 can in turn be arranged in the previously described normal plane 31. Furthermore, the center of the support area of the forehead contact unit 13 is also arranged on the side, facing away from the bending axis 21, of the Eyepiece plane 20.

In the following paragraphs 5 to 8, additional possible embodiments of the support device 5 as well as the symmetry device 24 for the forehead contact unit 13 are shown and described, wherein in contrast to the embodiments described in FIGS. 2 to 4, a transmission arrangement deviating from this is provided. The arrangement and embodiment of tubes 2, 3 and their swiveling support in reference to each other on the joint bending axis 21 can be done analogously, as previously described in detail. Therefore, it is no longer discussed in greater detail.

Here a separate base part 23-2 is respectively provided, which comprises a support arm 42 or 42-1. The support arm 42, 42-1, by means of a pivoting arrangement or a bearing arrangement, is supported in a pivotal fashion about the common swivel center arranged located in a common bending axis 21 in a normal direction with regard to the swivel level aligned to the common bending axis 21 on the observation device or binoculars 1. Here, the bending axis 21 may at least form in sections a physical part of an axis, which can be formed by means of a bearing pin. On the end section, facing away from the pivot center of the support arm 42, 42-1, the forehead contact unit 13 is arranged or designed. This way, the support arm 42, 42-1 can be pivoted along with the forehead contact unit 13 in the swivel level. Only a freely rotating support of the support arm 42, 42-1 around the common bending axis 21 occurs, however, the swivel movement and relative positioning of the same relative to the symmetry plane 22 is compulsory, as described below.

Figure 5:
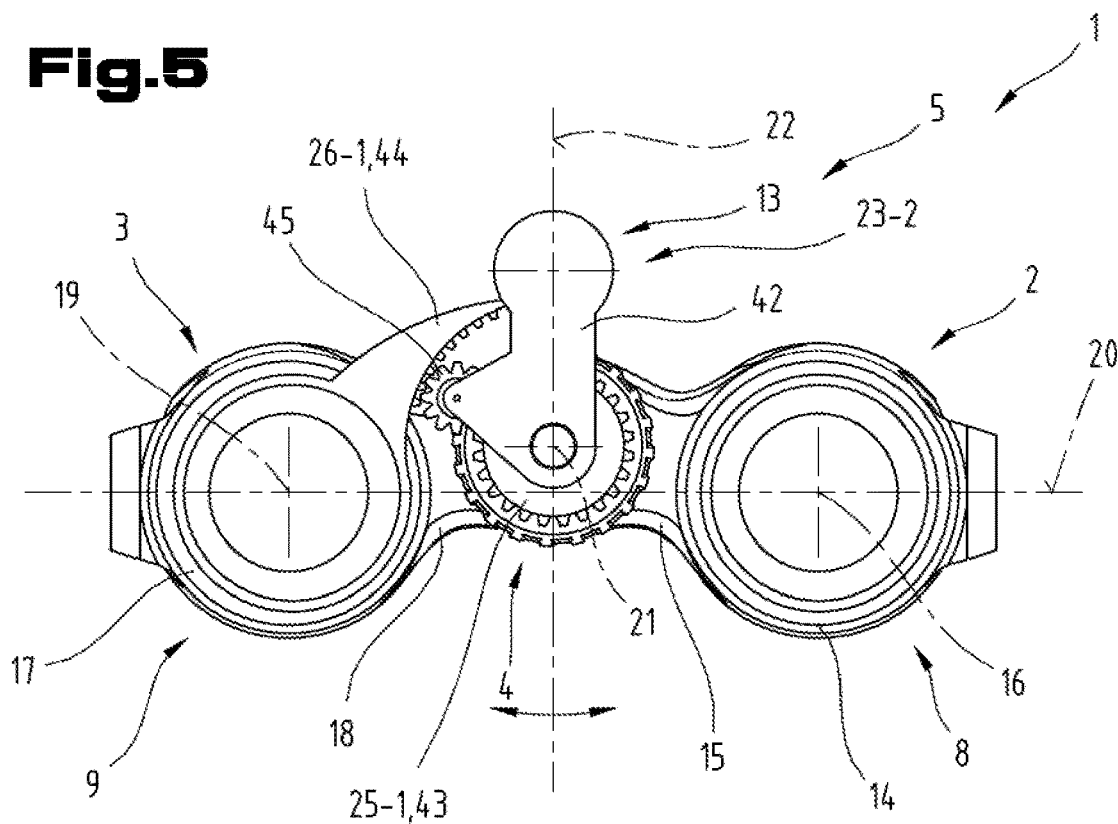
FIG. 5 is the binoculars with a different embodiment of the symmetry device for the support device in a first broad position of the eyepieces, in a front view as well as a highly schematic representation.
Figure 6:
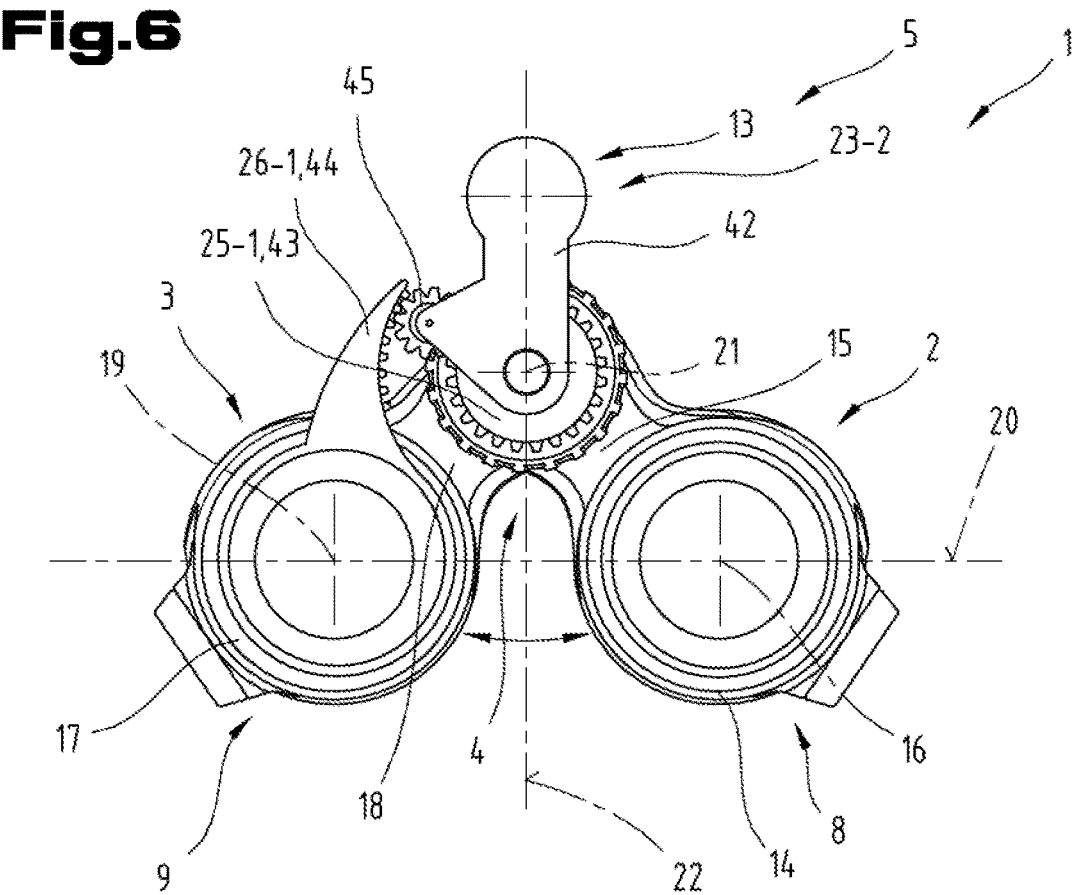
FIG. 6 is the binoculars, including the symmetry device according to FIG. 5, in a second narrower position of the eyepieces, in a front view and a highly schematic representation.

Thus, FIGS. 5 and 6 show a first possible and, perhaps independent exemplary embodiment of the symmetry device 24 for the support device 5 along with the observation device or the binoculars 1, wherein in turn, the same reference signs or component designations are used for identical parts as in the previous FIGS. 1 to 4. In order to avoid unnecessary repetitions, reference is made to the detailed description in the previous FIGS. 1 to 4 or pointed to.

Once more a first adjusting element 25-1 is provided here, comprising at least one partial section of a toothed wheel 43. A center of the toothed wheel 43 or the partial section of the toothed wheel 43 is arranged located in the common bending axis 21.

The second adjusting element 26-1 comprises at least one partial section of an internal gear 44, wherein a center of the partial section of the inner gear 44 being arranged located in the joint bending axis 21.

The first adjusting element 25-1 formed by the gear 43 or its partial section is arranged with the first tube 2 in a drive connection or is arranged fixed on this or a part thereof. The second adjusting element 26-1 formed by the inner gear 44 or its partial section is in a drive connection with the second tube 3 or is arranged fixed thereon or a part thereof. It would also be possible, in turn, to mount or arrange the two adjusting elements 25-1 and 26-1 on the respective tubes 2 and 3 to be exchanged against each other. Then the first adjusting element 25-1 would be in a drive connection with the second tube 3 and the second adjusting element 26-1 with the first tube 2. Here, a relative stationary mounting or fastening of the adjusting elements 25-1 and 26-1 is assumed on the respective tubes 2 and 3.

For transmitting the relative swivel movement of both tubes 2 and 3 in reference to each other when adjusting the eye distance to the symmetry device 24, between the partial section of the toothed wheel 43 and the partial section of the inner gear 44 a planetary gear 45 is arranged or provided.

The planetary gear 45 is rotationally supported at the support arm 42 or on a cantilever connected to the support arm 42 and can thus be pivoted like a planetary wheel, and transfer the pivoting movement between the partial section of the toothed wheel 43 and the partial section of the inner gear 44 upon the support arm 42. The gear 43 or its subsection forms the so-called sun gear here, wherein the inner gear 44 or the subsection forms the hollow wheel. The symmetry device 24 can therefore be embodied in the form of a planetary gear, or designated as such.

The transmission ratio from the partial section of the inner gear 44 to the partial section of the toothed wheel 43 is 2:1. The transmission ratio can also be defined by means of the roller diameter. Here, a roller diameter of the partial section of the inner gear 44 shows twice the value as a roller diameter of the partial section of the toothed wheel 43.

Figure 7:
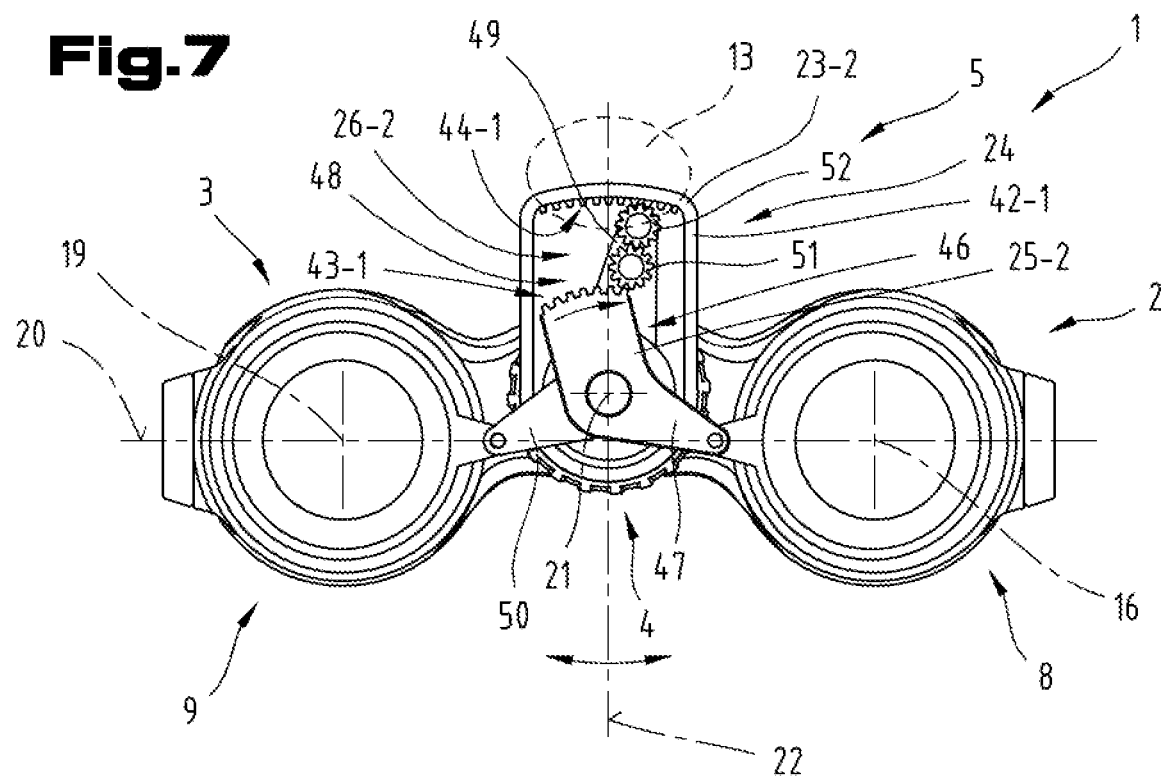
FIG. 7 is the binoculars with another possible embodiment of the symmetry device for the support device in a first broad position of the eyepieces, in a front view as well as a largely schematic representation.
Figure 8:
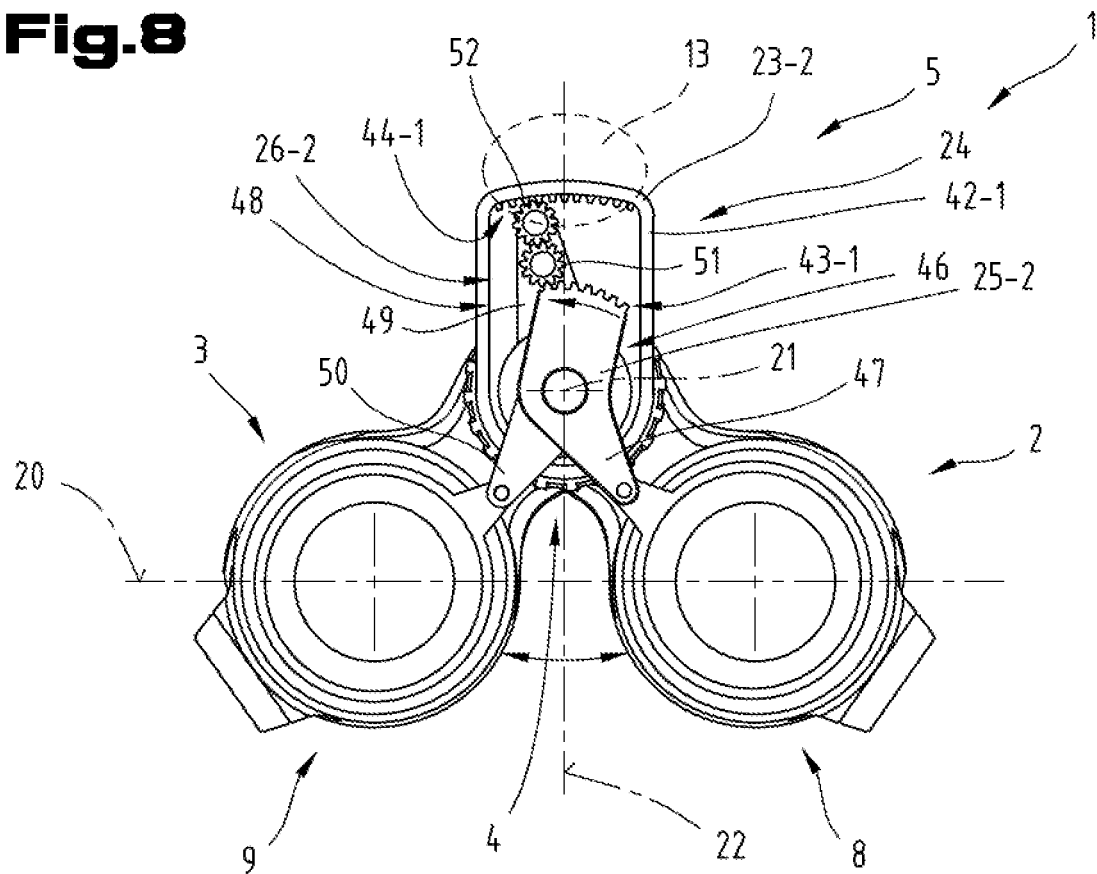
FIG. 8 is the binoculars, including the symmetry device according to FIG. 7, in a second narrower position of the eyepieces, in a front view and a largely schematic representation.

In FIGS. 7 and 8, another possible and, perhaps independent design of the support device 5 and the symmetry device 24 is shown with the observation device or the binoculars 1 wherein, in turn, the same reference characters or component designations are used for identical parts, as in the previous FIGS. 1 to 6. In order to avoid unnecessary repetitions, reference is made to the detailed description in the previous FIGS. 1 to 6 or pointed to.

In this exemplary embodiment, a transmission arrangement in the type of a planetary gear is likewise used for the formation of the symmetry device 24. Here, only the formation and design of the symmetry device 24 is discussed in greater detail, wherein the components not described in greater detail are designed analogously, as they have already been described in detail.

Once more a separate base part 23-2 is provided here, comprising a support arm 42-1. By means of a pivoting arrangement or a bearing arrangement, the support arm 42-1 is provided in a rotational fashion about a swivel center located in the common bending axis 21 of a swivel level arranged in a normal alignment with regard to the common bending axis 21 on the observation device or on the binoculars 1. The bending axis 21 can at least in sections form a physical part of an axis, which can be formed by means of a bearing pin. On the end section facing away from the pivot center of the carrier arm 42-1, the forehead contact unit 13 is arranged or designed, which is only indicated for a sake of clarity in dot-dash lines. The support arm 42-1 can thus be pivoted along with the forehead contact unit 13 in the swivel level. Only a freely rotating bearing of the support arm 42-1 occurs around the common bending axis 21, however the swivel movement and relative positioning with regard to the symmetry plane 22 is compulsory, as described below.

Here a first adjusting element 25-2 comprises a first control lever 46, wherein the first control lever 46 similar to the partial section of the previously described toothed wheel 43, is also supported in a rotational fashion in the joint bending axis 21. The adjusting lever 46 also includes on the side facing the forehead contact unit 13 at least one partial section of a toothed wheel 43-1 and, if necessary, on the partial section of the toothed wheel 43-1 opposite the joint bending axis 21 a first operating extension 47. The gear 43-1 or its subsection forms the sun gear as with a planetary gear. The center of the partial section of the toothed wheel 43-1 is also arranged located in the common bending axis 21. The first operating extension 47 is in a drive connection with the first monocular tube 2 and is particularly held thereat in a fixed fashion. To do this, a screw connection, a rivet connection, a bolt connection, or the like can be provided.

A second adjusting element 26-2 comprises a second adjusting lever 48, wherein this is also supported in a rotary fashion in the common bending axis 21. The second adjusting lever 48 includes on its side facing the forehead contact unit 13 a control lever arm 49 and may comprise or show at its side opposite the control lever arm 49 in reference to the joint bending axis 21 a second operating extension 50. If the second operating extension 50 is provided, it is in a drive connection with the second monocular tube 3 and is in particular held fixed on this location. Thus, with a swivel movement of the two tubes, 2, 3 relative to one another, the swivel movement can be transmitted directly to the respective adjusting element 25-2 and 26-2 and thus to the respective adjusting lever 46, 48.

It would also be possible, to waive the arrangement or the provision of at least one operating extension 47 and/or 50. In some models of the binocular 1 it may show or comprise in the area of the bending axis 21, among other things, a battery compartment, in particular one integrated into the focusing dial, comprising a battery cover not shown in greater detail. The battery compartment and its battery cover can be installed at one of the two tubes 2 or 3 in a fixed fashion and thus it must be rotationally fixed to one of the tubes 2 or 3. For example, it would be possible to connect the first adjusting element 25-2, in particular the first control lever 46 directly to the battery compartment, in particular by fastening the adjusting element 25-2 on the battery compartment instead of the battery cover, and to waive the first actuation extension 47. Regardless of this, it would also be possible to connect the second adjusting element 26-2, in particular the second adjusting lever 48 directly to the battery compartment and to waive the second operating extension 50. In this way, when omitting at least one of the actuating extensions 47, 50 still the swivel movement can be transmitted from the respective tube 2 or 3, depending to which battery compartment it is connected to in a torque-proof fashion, to on the first adjusting element 25-2 or the second adjusting element 26-2. For example, in this exemplary embodiment the first adjusting element 25-2 with the first monocular tube 2 is in a drive connection or is arranged fixed thereon, whereby the second adjusting element 26-2 with the second monocular tube 3 is in a drive connection or is arranged fixed thereto.

The base part 23-2, here formed by the support arm 42-1, is provided at its end section, and distanced from the common bending axis 21 with a partial section of an internal gear 44-1. The center of the partial section of the inner gear 44-1 is arranged located in the joint bending axis 21.

Here, for the transmission of the pivoting movement of the two actuators 25-2 and 26-2 upon the base part 23-2 with the forehead contact unit 13 a first planetary gear 51 and a second planetary gear 52 are provided. The two planetary gears 51 and 52 are supported in a rotational fashion on the adjusting lever arm 49 of the second adjusting lever 48 and thus on the second adjusting element 26-2. Furthermore, the two planetary gears 51 and 52 are arranged between the partial section of the toothed wheel 43-1 and the partial section of the inner gear 44-1. The two planetary gears 51 and 52 are in such a manner arranged on the second adjusting lever 48 such that they are engaging each other. The first planetary gear 51 engages the partial section of the toothed wheel 43-1 and the second planetary gear 52 engages the partial section of the inner gear 44-1. Preferably, the planetary gears 51 and 52 show the same size, in particular the same number of teeth. The term "engaging each other" is understood here as a combing intervention of the gears and the sections of toothed wheel. Furthermore, the two planetary gears 51, 52 are arranged in a radial alignment with regard to the common bending axis 21 behind one another on the second control lever 48.

In this exemplary embodiment, it is also provided that the transmission ratio from the partial section of the inner gear 44-1 to the partial section of the toothed wheel 43-1 is selected with 2:1. In relation to the roller diameter, the roller diameter of the partial section of the inner gear 44-1 shows twice the value compared to the roller diameter of the partial section of the toothed wheel 43-1.

The presentation of housings and/or covers has been waived for the sake of clarity.

In all the exemplary embodiments described above, the components or component groups described below can also be used. This is shown in FIG. 7 in a simplified fashion.

For setting and adjusting the distance of the support surface of the forehead contact unit 13 from the eyepieces 8, 9 in the axial direction with regard to the bending axis 21 an adjusting device 53 may be provided. With it the forehead contact unit 13 can be adjusted relative to the base part 23, 23-1, 23-2 in the direction of a position axis 54. Thus, the distance in the direction of the joint bending axis 21 between the support surface of the forehead contact unit 13 and the base part 23, 23-1, 23-2 and thus the respective user can be individually adapted. Depending on the embodiment of the forehead contact unit 13 the position axis 54 of the adjusting device 53 may show a parallel alignment with regard to the joint bending axis 21 or an inclined orientation with regard to the joint bending axis 21. Preferably the position axis 54 of the adjusting device 53 is arranged or aligned extending in the symmetry plane 22 or extending parallel thereto.

Furthermore, it would still be possible, as already described previously, to arrange the forehead contact unit 13 swaying relative to the base part 23, 23-1, 23-2. A swivel arrangement 55 is provided by which the forehead contact unit 13 can be pivoted with its support surface in its position relative to the base part 23, 23-1, 23-2. The pivoting movement can here be done only in one swing level or in a spatial manner. This depends on the selection and embodiment of the swivel arrangement 55.

The exemplary embodiments show possible design variants, where at this point it shall be pointed out that the invention is not restricted to the specifically depicted design variants, but rather also includes various combinations of the individual design variants, and based on the teaching regarding technical implementation using the present invention known to one trained in the art.

The scope of protection is determined by the claims. However, the description and the drawings are to be used to interpret the claims. Individual features or combinations of features from the shown and described various embodiments may represent independent inventive solutions. The objective underlying the independent inventive solutions can be taken from the description.

All information on value ranges in this description must be understood in such a way that they cover any and all arbitrary subsections, e.g., statement 1 to 10 shall be understood in such a way that all subsections start with a lower limit of 1 up to the upper limit of 10, i.e., all subsections start with a lower limit of 1 or more and end at an upper limit of 10 or less, e.g., 1 to 1.7, or 3.2 to 8.1, or 5.5 to 10.

For the sake of good order, it should be conclusively pointed out that some elements were partially shown in a normal manner and/or enlarged and/or reduced for better understanding of the structure.

The invention claimed is:

1. Binoculars comprising:
   a first monocular tube comprising a first housing part and at least one first bridge part;
   a second monocular tube comprising a second housing part and at least one second bridge part, wherein the at least one second bridge part faces the at least one first bridge part;
   a support device arranged between the first and second monocular tubes for supporting the binoculars at the side of an eyepiece on a face of an observer, the support device comprising a forehead contact unit extending from the binoculars and arranged to support the binoculars during use against an area above an observer's nose or forehead;
   a swivel hinge connecting the at least one second bridge part with the at least one first bridge part, such that the first and second monocular tubes are connected in an articulate fashion at a bending axis formed by the swivel hinge, wherein between the first and second monocular tubes a symmetry plane is defined in the bending axis; and
   a symmetry device configured to maintain a center of a support surface of the forehead contact unit in an area of the symmetry plane during the pivoting of the first and second monocular tubes around the bending axis by the swivel hinge,
   wherein the symmetry device comprises a first adjusting element and a second adjusting element, wherein via the two adjusting elements, the forehead contact unit, seen in the axial direction of the bending axis, is arranged in the area of the symmetry plane and the first adjusting element is in a drive connection with the first monocular tube or is arranged stationary thereon, and the second adjusting element is in a drive connection with the second monocular tube or is arranged stationary thereon, and
   wherein a distance between the first and second monocular tubes is adjustable by mutual pivoting the first and second monocular tubes around the bending axis.

2. The binoculars according to claim 1, wherein the support device is fastened on the binoculars facing the observer.

3. The binoculars according to claim 1, wherein the forehead contact unit is arranged with its support point along the bending axis of the swivel hinge.

4. The binoculars according to claim 1, further comprising a roller-shaped central drive wherein the support device is arranged on the central drive.

5. The binoculars according to claim 1, wherein the support device is arranged along the bending axis extending between the two eyepieces, and wherein the support device is longitudinally displaceable along the bending axis.

6. The binoculars according to claim 1, wherein the support device can be removed from the binoculars.

7. The binoculars according to claim 1, wherein the forehead contact unit of the support device is rotational in reference to the binoculars.

8. The binoculars according to claim 1, wherein the forehead contact unit is axially adjustable in reference to the binoculars.

9. The binoculars according to claim 1, wherein the forehead contact unit is supported in a swaying fashion in reference to the binoculars.

10. The binoculars according to claim 1, wherein the second adjusting element comprises at least one partial section of an internal gear and a center of the partial section of the inner gear is arranged in the bending axis.

11. The binoculars according to claim 1, wherein the support device comprises a base part and the base part of the support device is in a drive connection both with the first adjusting element as well as the second adjusting element.

12. The binoculars according to claim 11, wherein the first monocular tube includes a first eyepiece and defines a first eyepiece axis and the second monocular tube includes a second eyepiece and defines a second eyepiece axis, the two eyepiece axes further define an eyepiece plane extending in a parallel direction relative to the bending axis, the eyepiece plane being perpendicular to the symmetry plane, and
wherein a center of the support surface of the forehead contact unit is arranged on one of the sides, facing away from the bending axis of the two eyepieces, defining the eyepiece plane.

13. The binoculars according to claim 12, wherein the first adjusting element is formed by a first bolt with a first bolt axis and the second adjusting element by means of a second bolt with a second bolt axis and the bolt axes of both bolts each are parallel alignment relative to the bending axis.

14. The binoculars according to claim 13, wherein the first bolt is arranged on a side of the symmetry plane and distanced therefrom and the second bolt is arranged on the opposite side of the symmetry plane and distanced therefrom and the two bolts with their bolt axes are arranged in a normal alignment to the symmetry plane located in a normal plane and the normal plane shows a parallel alignment relative to the eyepiece plane.

15. The binoculars according to claim 13, wherein the two bolts with their bolt axes are arranged symmetrically relative to the symmetry plane.

16. The binoculars according to claim 13, wherein the base part of the support device, on a side of the symmetry plane and distanced therefrom, a first recess or a first penetration is provided and on the opposite side of the symmetry plane as well as distanced therefrom a second recess or a second aperture is arranged.

17. The binoculars according to claim 16, wherein the first recess or the first aperture and the second recess or the second aperture in the normal alignment to the symmetry plane are aligned in a normal plane and the normal plane shows a parallel alignment relative to the eyepiece plane.

18. The binoculars according to claim 17, wherein the second recess or the second aperture is designed as an oblong hole and the oblong hole extends in the direction of the normal plane.

19. The binoculars according to claim 17, wherein the first recess or the first aperture is designed as a bore.

20. The binoculars according to claim 19, wherein a center of the bore and a center of the oblong hole are arranged symmetrically in reference to the symmetry plane.

21. The binoculars according to claim 20, wherein the first bolt engages the first recess or the first aperture and the second bolt engages the second recess or the second aperture of the base part.

22. The binoculars according to claim 21, wherein the base part is formed in one piece and the recesses or apertures are arranged therein and also the forehead contact unit is arranged on the base part.

23. The binoculars according to the claim 13, wherein the base part comprises a first control arm with a first end section and a second end section and a second control arm with a first end section and a second end section, and the two first end sections of the control arms are connected to each other in an articular fashion and the second end section of the first control arm is connected by the first bolt forming the adjusting element and the second end section of the second control arm rests on the second bolt forming the adjusting element.

24. The binoculars according to claim 23, wherein the forehead contact unit is arranged in the area of the two first end regions of the control arms connected to each other in an articular fashion.

25. The binoculars according to claim 11, further comprising an adjusting device by which the forehead contact unit is adjustable relative to the base part in the direction of a position axis and thus a distance in the direction of the bending axis between the support surface of the forehead contact unit and the base part is configured in an adjustable fashion.

26. The binoculars according to claim 25, wherein the position axis of the adjusting device shows a parallel alignment relative to the bending axis or an inclined orientation relative to the bending axis.

27. The binoculars according to claim 25, wherein the position axis of the adjusting device is arranged extending in the symmetry plane.

28. The binoculars according to claim 11, wherein a pivot arrangement is provided by which pivot arrangement the support surface of the forehead contact unit is pivotal relative to the base part and a tilt of the support surface relative to the bending axis is designed to be changeable.

29. The binoculars according to claim 11, wherein the base part comprises a support arm and the support arm along with the forehead contact unit pivotal about a swivel center located in the bending axis in a normal orientation relative to the bending axis at the binoculars.

30. The binoculars according to claim 11, wherein the first adjusting element comprises at least one partial section of a toothed wheel and a center of the toothed wheel is arranged in the bending axis.

31. The binoculars according to claim 30, wherein between the partial section of the toothed wheel and the partial section of the inner gear a planetary gear is arranged and the planetary gear is supported rotationally at the support arm of the base part.

32. The binoculars according to claim 30, wherein the transmission ratio from the partial section of the inner gear to the partial section of the toothed wheel is 2:1.

33. The binoculars according to claim 30, wherein the first adjusting element comprises a first control lever supported pivotally in the bending axis and arranged on its side facing the forehead contact unit and the partial section of the toothed wheel and, the first adjusting lever is provided on the side opposite the partial section of the toothed wheel of the bending axis with a first operating extension which is in a drive connection with the first monocular tube.

34. The binoculars according to claim 33, wherein the second adjusting element comprises a second adjusting lever, which second adjusting lever is supported rotationally in the bending axis and is provided on its side facing the forehead contact unit with an adjusting lever arm and, if necessary, the second adjusting lever is provided on the adjusting lever arm opposite the bending axis with a second operating extension, and that the second operating extension is in a drive connection with the second monocular tube.

35. The binoculars according to claim 34, wherein between the partial section of the toothed wheel and the partial section of the inner gear a first planetary gear and a second planetary gear are provided and the planetary gears can be supported in a rotational fashion on the adjusting lever arm of the second adjusting lever.

36. The binoculars according to claim 35, wherein the two planetary gears are arranged in a radial alignment relative to the joint bending axis behind each other at the second control lever.

37. The binoculars according to claim 35, wherein the transmission ratio from the partial section of the inner gear to the partial section of the toothed wheel is 2:1.

38. The binoculars according to claim 35, wherein the two planetary gears are provided in the second control lever, such that they engage each other, and the first planetary gear engages the partial section of the toothed wheel and the second planetary gear engages the partial section of the inner gear.

39. The binoculars according to claim 38, wherein the two planetary gears include same number of teeth.

40. The binoculars according to claim 33, wherein the support arm of the base part is provided on its end section, distanced from the bending axis with a partial section of an inner gear and a center of the partial section of the inner gear is arranged positioned in the bending axis.

* * * * *